United States Patent
Ritchey

(10) Patent No.: US 11,722,026 B2
(45) Date of Patent: Aug. 8, 2023

(54) FAULT TOLERANT ROTATING ELECTRIC MACHINE

(71) Applicant: DPM TECHNOLOGIES INC., Calgary (CA)

(72) Inventor: Jonathan Gale Ritchey, Kelowna (CA)

(73) Assignee: DPM TECHNOLOGIES INC., Calgary (CA)

(*) Notice: Subject to any disclaimer, the term of this patent is extended or adjusted under 35 U.S.C. 154(b) by 89 days.

(21) Appl. No.: 17/605,354

(22) PCT Filed: Apr. 23, 2020

(86) PCT No.: PCT/CA2020/050534
§ 371 (c)(1),
(2) Date: Oct. 21, 2021

(87) PCT Pub. No.: WO2020/512154
PCT Pub. Date: Oct. 29, 2020

(65) Prior Publication Data
US 2022/0190770 A1    Jun. 16, 2022

Related U.S. Application Data

(60) Provisional application No. 62/837,554, filed on Apr. 23, 2019.

(51) Int. Cl.
| H02K 3/28 | (2006.01) |
| H02P 29/028 | (2016.01) |
| H02P 25/22 | (2006.01) |
| H02P 27/06 | (2006.01) |

(52) U.S. Cl.
CPC ........... *H02P 29/028* (2013.01); *H02P 25/22* (2013.01); *H02P 27/06* (2013.01)

(58) Field of Classification Search
CPC ........ H02P 29/028; H02P 25/22; H02P 27/06; H02K 11/20; H02K 2213/06
See application file for complete search history.

(56) References Cited

U.S. PATENT DOCUMENTS

| 757,394 A | 4/1904 | Eickemeyer et al. |
| 908,097 A | 12/1908 | Herz |
| 1,980,808 A | 11/1934 | Leibing |
| 2,091,190 A | 8/1937 | Tullio |
| 2,189,524 A | 2/1940 | Randolph et al. |

(Continued)

FOREIGN PATENT DOCUMENTS

| AU | 2018101036 A4 | 10/2018 |
| BR | PI0415663 A | 12/2006 |

(Continued)

OTHER PUBLICATIONS

International Search Report and Written Opinion dated Aug. 15, 2022 in PCT/CA2022/050753.

(Continued)

*Primary Examiner* — Muhammad S Islam
(74) *Attorney, Agent, or Firm* — Cozen O'Connor

(57) ABSTRACT

The disclosed technology provides systems and methods to employ fault tolerance for rotating electric machines operating as motors or generators. A unique system architecture and control elements allow rotating electric machines the ability to isolate faulted conditions and continue to operate.

20 Claims, 5 Drawing Sheets

| Series Configuration | Switch State |
|---|---|
| Switch A | Open |
| Switch B | Closed |
| Switch C | Open |
| Switch D | Position 1 |

| Hairpin Configuration | Switch State |
|---|---|
| Switch A | Open |
| Switch B | Open |
| Switch C | Closed |
| Switch D | Position 2 |

| Parallel Configuration | Switch State |
|---|---|
| Switch A | Closed |
| Switch B | Open |
| Switch C | Closed |
| Switch D | Position 1 |

(56) References Cited

U.S. PATENT DOCUMENTS

| | | |
|---|---|---|
| 2,333,575 A | 11/1943 | Kilgore et al. |
| 2,407,883 A | 9/1946 | Corwill |
| 2,430,886 A | 11/1947 | Glen |
| 2,432,117 A | 12/1947 | Morton |
| 2,488,729 A | 11/1949 | Kooyman |
| 2,504,681 A | 4/1950 | Hall |
| 2,516,114 A | 7/1950 | Green |
| 2,601,517 A | 6/1952 | Hammes |
| 2,680,822 A | 6/1954 | Brainard |
| 2,719,931 A | 10/1955 | William |
| 3,083,311 A | 3/1963 | Shelley |
| 3,149,256 A | 9/1964 | Walter |
| 3,153,157 A | 10/1964 | Erich |
| 3,169,203 A | 2/1965 | Lavin et al. |
| 3,223,865 A | 12/1965 | Lewis |
| 3,237,034 A | 2/1966 | Shelley |
| 3,293,470 A | 12/1966 | Richard |
| 3,411,027 A | 11/1968 | Heinz |
| 3,482,156 A | 12/1969 | Porath |
| 3,549,925 A | 12/1970 | Johnson |
| 3,621,370 A | 11/1971 | Vandervort |
| 3,713,015 A | 1/1973 | Frister |
| 3,801,844 A | 4/1974 | Steele |
| 3,809,936 A | 5/1974 | Klein |
| 3,870,928 A | 3/1975 | Allen |
| 3,903,863 A | 9/1975 | Katsumata |
| 3,942,913 A | 3/1976 | Bokelman |
| 3,944,855 A | 3/1976 | Le |
| 3,965,669 A | 6/1976 | Larson et al. |
| 3,973,137 A | 8/1976 | Drobina |
| 3,973,501 A | 8/1976 | Briggs |
| 3,984,750 A | 10/1976 | Pfeffer et al. |
| 3,992,641 A | 11/1976 | Heinrich et al. |
| 4,001,887 A | 1/1977 | Platt et al. |
| 4,004,426 A | 1/1977 | Laing |
| 4,013,937 A | 3/1977 | Pelly et al. |
| 4,015,174 A | 3/1977 | Cotton |
| 4,020,369 A | 4/1977 | Shoupp et al. |
| 4,023,751 A | 5/1977 | Richard |
| 4,035,701 A | 7/1977 | Jensen |
| 4,039,848 A | 8/1977 | Winderl |
| 4,050,295 A | 9/1977 | Harvey |
| 4,051,402 A | 9/1977 | Gruber |
| 4,074,159 A | 2/1978 | Robison |
| 4,074,180 A | 2/1978 | Sharpe et al. |
| 4,081,726 A | 3/1978 | Brimer et al. |
| 4,095,922 A | 6/1978 | Farr |
| 4,100,743 A | 7/1978 | Trumbull et al. |
| 4,107,987 A | 8/1978 | Robbins et al. |
| 4,126,933 A | 11/1978 | Anderson et al. |
| 4,141,331 A | 2/1979 | Mallory |
| 4,142,696 A | 3/1979 | Nottingham |
| 4,142,969 A | 3/1979 | Funk et al. |
| 4,151,051 A | 4/1979 | Evans |
| 4,155,252 A | 5/1979 | Morrill |
| 4,159,496 A | 6/1979 | Stevens |
| 4,167,692 A | 9/1979 | Sekiya et al. |
| 4,168,459 A | 9/1979 | Roesel |
| 4,179,633 A | 12/1979 | Kelly |
| 4,181,468 A | 1/1980 | Kent et al. |
| 4,187,441 A | 2/1980 | Oney |
| 4,191,893 A | 3/1980 | Grana et al. |
| 4,196,572 A | 4/1980 | Hunt |
| 4,203,710 A | 5/1980 | Farr |
| 4,211,945 A | 7/1980 | Tawse |
| 4,215,426 A | 7/1980 | Klatt |
| 4,237,391 A | 12/1980 | Schur et al. |
| 4,245,601 A | 1/1981 | Crowder |
| 4,246,490 A | 1/1981 | Keramati et al. |
| 4,247,785 A | 1/1981 | Apgar |
| 4,253,031 A | 2/1981 | Frister |
| 4,254,344 A | 3/1981 | Fancy et al. |
| 4,260,901 A | 4/1981 | Woodbridge |
| 4,261,312 A | 4/1981 | Hart |
| 4,261,562 A | 4/1981 | Flavell |
| 4,276,481 A | 6/1981 | Parker |
| 4,286,581 A | 9/1981 | Atkinson |
| 4,289,970 A | 9/1981 | Deibert |
| 4,291,235 A | 9/1981 | Bergey et al. |
| 4,297,604 A | 10/1981 | Tawse |
| 4,302,683 A | 11/1981 | Burton |
| 4,305,031 A | 12/1981 | Wharton |
| 4,308,479 A | 12/1981 | Richter |
| 4,313,080 A | 1/1982 | Park |
| 4,316,096 A | 2/1982 | Syverson |
| 4,317,437 A | 3/1982 | Lindgren |
| 4,322,667 A | 3/1982 | Ohba |
| 4,325,429 A | 4/1982 | Bevan et al. |
| 4,329,138 A | 5/1982 | Riordan |
| 4,338,557 A | 7/1982 | Wanlass |
| 4,339,704 A | 7/1982 | McSparran et al. |
| 4,340,822 A | 7/1982 | Gregg |
| 4,355,276 A | 10/1982 | Vittay |
| 4,358,693 A | 11/1982 | Palmer et al. |
| 4,364,005 A | 12/1982 | Kohzai et al. |
| 4,373,488 A | 2/1983 | Neuhalfen |
| 4,385,246 A | 5/1983 | Schur et al. |
| 4,389,691 A | 6/1983 | Hancock |
| 4,394,720 A | 7/1983 | Gabor |
| 4,402,524 A | 9/1983 | D et al. |
| 4,406,950 A | 9/1983 | Roesel |
| 4,412,170 A | 10/1983 | Roesel |
| 4,419,617 A | 12/1983 | Reitz |
| 4,433,280 A | 2/1984 | Lindgren |
| 4,433,355 A | 2/1984 | Chew et al. |
| 4,434,389 A | 2/1984 | Langley et al. |
| 4,434,617 A | 3/1984 | Walsh |
| 4,444,444 A | 4/1984 | Benedetti et al. |
| 4,446,377 A | 5/1984 | Kure-Jensen et al. |
| 4,454,865 A | 6/1984 | Tammen |
| 4,456,858 A | 6/1984 | Loven |
| 4,458,489 A | 7/1984 | Walsh |
| 4,459,536 A | 7/1984 | Wirtz |
| 4,473,751 A | 9/1984 | Rombach et al. |
| 4,477,745 A | 10/1984 | Lux |
| 4,503,368 A | 3/1985 | Sakamoto |
| 4,511,805 A | 4/1985 | Boy-Marcotte et al. |
| 4,513,576 A | 4/1985 | Dibrell et al. |
| RE31,947 E | 7/1985 | Farr |
| 4,532,431 A | 7/1985 | Iliev et al. |
| 4,532,460 A | 7/1985 | Gale et al. |
| 4,535,263 A | 8/1985 | Avery |
| 4,536,668 A | 8/1985 | Boyer |
| 4,536,672 A | 8/1985 | Kanayama et al. |
| 4,539,485 A | 9/1985 | Neuenschwander |
| 4,549,121 A | 10/1985 | Gale |
| 4,575,671 A | 3/1986 | Lee et al. |
| 4,578,609 A | 3/1986 | McCarty |
| 4,581,999 A | 4/1986 | Campagnuolo et al. |
| 4,591,746 A | 5/1986 | Kamiyama |
| 4,593,289 A * | 6/1986 | Newcomb ............... H01Q 9/44 |
| | | 343/747 |
| 4,598,240 A | 7/1986 | Gale et al. |
| 4,599,551 A | 7/1986 | Wheatley et al. |
| 4,601,354 A | 7/1986 | Campbell et al. |
| 4,605,874 A | 8/1986 | Whiteley |
| 4,628,219 A | 12/1986 | Troscinski |
| 4,630,817 A | 12/1986 | Buckley |
| 4,638,224 A | 1/1987 | Gritter |
| 4,639,647 A | 1/1987 | Posma |
| 4,641,080 A | 2/1987 | Glennon et al. |
| 4,642,031 A | 2/1987 | Farr |
| 4,642,988 A | 2/1987 | Benson |
| 4,644,233 A | 2/1987 | Suzuki |
| 4,654,066 A | 3/1987 | Garcia et al. |
| 4,654,537 A | 3/1987 | Gaspard |
| 4,656,379 A | 4/1987 | McCarty |
| 4,658,166 A | 4/1987 | Oudet |
| 4,658,346 A | 4/1987 | Templeton |
| 4,664,685 A | 5/1987 | Young |
| 4,668,885 A | 5/1987 | Scheller |
| 4,674,199 A | 6/1987 | Lakic |
| 4,675,591 A | 6/1987 | Pleiss |
| 4,678,954 A | 7/1987 | Takeda et al. |

(56) References Cited

U.S. PATENT DOCUMENTS

| | | |
|---|---|---|
| 4,682,067 A | 7/1987 | Oudet |
| 4,684,872 A | 8/1987 | Stewart |
| 4,687,945 A | 8/1987 | Ebeling |
| 4,692,675 A | 9/1987 | Falk |
| 4,698,538 A | 10/1987 | Yoshida |
| 4,698,562 A | 10/1987 | Gale et al. |
| 4,710,667 A | 12/1987 | Whiteley |
| 4,713,569 A | 12/1987 | Schwartz |
| 4,729,218 A | 3/1988 | Haselbauer et al. |
| 4,737,070 A | 4/1988 | Horiuchi et al. |
| 4,739,203 A | 4/1988 | Miyao et al. |
| 4,772,842 A | 9/1988 | Ghosh |
| 4,779,038 A | 10/1988 | Eckerfeld |
| 4,783,028 A | 11/1988 | Olson |
| 4,783,038 A | 11/1988 | Gilbert et al. |
| 4,785,228 A | 11/1988 | Goddard |
| 4,806,812 A | 2/1989 | Masterman |
| 4,809,510 A | 3/1989 | Gaspard et al. |
| 4,811,091 A | 3/1989 | Morrison et al. |
| 4,814,651 A | 3/1989 | Elris et al. |
| 4,819,361 A | 4/1989 | Boharski |
| 4,831,300 A | 5/1989 | Lindgren |
| 4,835,433 A | 5/1989 | Brown |
| 4,843,270 A | 6/1989 | Dijken |
| 4,845,749 A | 7/1989 | Brickell et al. |
| 4,851,703 A | 7/1989 | Means |
| 4,862,021 A | 8/1989 | Larocca |
| 4,864,151 A | 9/1989 | Wyczalek et al. |
| 4,866,321 A | 9/1989 | Blanchard et al. |
| 4,872,805 A | 10/1989 | Horiuchi et al. |
| 4,874,346 A | 10/1989 | Wachspress |
| 4,876,991 A | 10/1989 | Galitello |
| 4,879,045 A | 11/1989 | Eggerichs |
| 4,879,484 A | 11/1989 | Huss |
| 4,879,501 A | 11/1989 | Haner |
| 4,884,953 A | 12/1989 | Golben |
| 4,885,526 A | 12/1989 | Szabo |
| 4,890,049 A | 12/1989 | Auinger |
| 4,893,040 A | 1/1990 | Turner et al. |
| 4,904,926 A | 2/1990 | Pasichinskyj |
| 4,906,877 A | 3/1990 | Ciaio |
| 4,914,412 A | 4/1990 | Engdahl et al. |
| 4,927,329 A | 5/1990 | Kliman et al. |
| 4,933,609 A | 6/1990 | Clark |
| 4,948,044 A | 8/1990 | Cacciatore |
| 4,950,973 A | 8/1990 | Kouba |
| 4,953,052 A | 8/1990 | Cartlidge et al. |
| 4,959,605 A | 9/1990 | Vaidya et al. |
| 4,963,780 A | 10/1990 | Hochstrasser |
| 4,973,868 A | 11/1990 | Wust |
| 4,977,529 A | 12/1990 | Gregg et al. |
| 4,980,595 A | 12/1990 | Arora |
| 4,985,875 A | 1/1991 | Mitchell |
| 4,994,700 A | 2/1991 | Bansal et al. |
| 5,002,020 A | 3/1991 | Kos |
| 5,003,209 A | 3/1991 | Huss et al. |
| 5,003,517 A | 3/1991 | Greer |
| 5,021,698 A | 6/1991 | Pullen et al. |
| 5,030,867 A | 7/1991 | Yamada et al. |
| 5,043,592 A | 8/1991 | Hochstrasser |
| 5,043,911 A | 8/1991 | Rashid |
| 5,047,680 A | 9/1991 | Toeroek |
| 5,053,662 A | 10/1991 | Richter |
| 5,053,732 A | 10/1991 | Elgass et al. |
| 5,057,726 A | 10/1991 | Mole et al. |
| 5,057,731 A | 10/1991 | Hancock |
| 5,058,833 A | 10/1991 | Carmouche |
| 5,065,305 A | 11/1991 | Rich |
| 5,072,145 A | 12/1991 | Davis et al. |
| 5,117,142 A | 5/1992 | Von |
| 5,120,332 A | 6/1992 | Wells |
| 5,130,595 A | 7/1992 | Arora |
| 5,146,146 A | 9/1992 | Saemann |
| 5,155,375 A | 10/1992 | Holley |
| 5,164,826 A | 11/1992 | Dailey |
| 5,174,109 A | 12/1992 | Lampe |
| 5,184,040 A | 2/1993 | Lim |
| 5,184,458 A | 2/1993 | Lampe et al. |
| 5,191,256 A | 3/1993 | Reiter et al. |
| 5,208,498 A | 5/1993 | Hamajima |
| 5,220,223 A | 6/1993 | Mehnert |
| 5,220,232 A | 6/1993 | Rigney et al. |
| 5,225,712 A | 7/1993 | Erdman |
| 5,227,702 A | 7/1993 | Nahirney |
| 5,237,815 A | 8/1993 | McArthur |
| 5,237,817 A | 8/1993 | Bornemisza et al. |
| 5,258,697 A | 11/1993 | Ford et al. |
| 5,267,129 A | 11/1993 | Anderson |
| 5,270,635 A | 12/1993 | Hoffman et al. |
| 5,281,094 A | 1/1994 | McCarty et al. |
| 5,283,488 A | 2/1994 | Ponnappan et al. |
| 5,289,041 A | 2/1994 | Holley |
| 5,289,072 A | 2/1994 | Lange |
| 5,306,972 A | 4/1994 | Hokanson et al. |
| 5,317,498 A | 5/1994 | Dhyandchand et al. |
| 5,336,933 A | 8/1994 | Ernster |
| 5,346,370 A | 9/1994 | Krohn |
| 5,355,044 A | 10/1994 | Uchida et al. |
| 5,369,324 A | 11/1994 | Saether |
| 5,370,112 A | 12/1994 | Perkins |
| 5,371,426 A | 12/1994 | Nagate et al. |
| 5,397,922 A | 3/1995 | Paul et al. |
| 5,400,596 A | 3/1995 | Shlien |
| 5,406,186 A | 4/1995 | Fair |
| 5,409,435 A | 4/1995 | Daniels |
| 5,413,010 A | 5/1995 | Sakakibara et al. |
| 5,418,436 A | 5/1995 | Apuzzo |
| 5,427,194 A | 6/1995 | Miller |
| 5,433,175 A | 7/1995 | Hughes et al. |
| 5,448,123 A | 9/1995 | Nilson et al. |
| 5,468,378 A | 11/1995 | De |
| 5,469,045 A | 11/1995 | Dove et al. |
| 5,473,205 A | 12/1995 | Haaland |
| 5,481,146 A | 1/1996 | Davey |
| 5,484,120 A | 1/1996 | Blakeley et al. |
| 5,489,290 A | 2/1996 | Furnish |
| 5,489,810 A | 2/1996 | Ferreira et al. |
| 5,496,238 A | 3/1996 | Taylor |
| 5,504,382 A | 4/1996 | Douglass et al. |
| 5,512,811 A | 4/1996 | Latos et al. |
| 5,517,822 A | 5/1996 | Haws et al. |
| 5,523,635 A | 6/1996 | Ferreira et al. |
| 5,523,637 A | 6/1996 | Miller |
| 5,530,307 A | 6/1996 | Horst |
| 5,568,005 A | 10/1996 | Davidson |
| 5,594,289 A | 1/1997 | Minato |
| 5,610,448 A | 3/1997 | Dattilo |
| 5,614,773 A | 3/1997 | Fabris |
| 5,619,423 A | 4/1997 | Scrantz |
| 5,625,241 A | 4/1997 | Ewing et al. |
| 5,625,276 A | 4/1997 | Scott et al. |
| 5,626,103 A | 5/1997 | Haws et al. |
| 5,637,934 A | 6/1997 | Fabris |
| 5,637,935 A | 6/1997 | Haaland |
| 5,641,276 A | 6/1997 | Heidelberg et al. |
| 5,650,679 A | 7/1997 | Boggs et al. |
| 5,653,135 A | 8/1997 | Miller et al. |
| 5,656,915 A | 8/1997 | Eaves |
| 5,659,300 A | 8/1997 | Dresselhuys et al. |
| 5,670,861 A | 9/1997 | Nor |
| 5,682,073 A | 10/1997 | Mizuno |
| 5,689,165 A | 11/1997 | Jones et al. |
| 5,689,175 A | 11/1997 | Hanson et al. |
| 5,690,209 A | 11/1997 | Kofoed |
| 5,696,413 A | 12/1997 | Woodbridge et al. |
| 5,696,419 A | 12/1997 | Rakestraw et al. |
| 5,699,218 A | 12/1997 | Kadah |
| 5,708,314 A | 1/1998 | Law |
| 5,709,103 A | 1/1998 | Williams |
| 5,710,474 A | 1/1998 | Mulgrave |
| 5,715,716 A | 2/1998 | Miller et al. |
| 5,717,316 A | 2/1998 | Kawai |
| 5,719,458 A | 2/1998 | Kawai |
| 5,720,194 A | 2/1998 | Miller et al. |

(56) References Cited

U.S. PATENT DOCUMENTS

| | | |
|---|---|---|
| 5,726,517 A | 3/1998 | Gueraud et al. |
| 5,731,649 A | 3/1998 | Caamano |
| 5,735,123 A | 4/1998 | Ehrig |
| 5,736,838 A | 4/1998 | Dove et al. |
| 5,744,896 A | 4/1998 | Kessinger et al. |
| 5,747,964 A | 5/1998 | Turnbull |
| 5,753,989 A | 5/1998 | Syverson et al. |
| 5,760,507 A | 6/1998 | Miller et al. |
| 5,762,584 A | 6/1998 | Daniels |
| 5,773,910 A | 6/1998 | Lange |
| 5,773,962 A | 6/1998 | Nor |
| 5,775,229 A | 7/1998 | Folk et al. |
| 5,777,413 A | 7/1998 | Nagata et al. |
| 5,784,267 A | 7/1998 | Koenig et al. |
| 5,785,137 A | 7/1998 | Reuyl |
| 5,793,137 A | 8/1998 | Smith |
| 5,799,484 A | 9/1998 | Nims |
| 5,801,454 A | 9/1998 | Leininger |
| 5,806,959 A | 9/1998 | Adams et al. |
| 5,833,211 A | 11/1998 | Berling |
| 5,833,440 A | 11/1998 | Berling |
| 5,838,085 A | 11/1998 | Roesel et al. |
| 5,838,138 A | 11/1998 | Henty |
| 5,839,508 A | 11/1998 | Tubel et al. |
| 5,844,342 A | 12/1998 | Taga et al. |
| 5,844,385 A | 12/1998 | Jones et al. |
| 5,850,111 A | 12/1998 | Haaland |
| 5,850,138 A | 12/1998 | Adams et al. |
| 5,850,351 A | 12/1998 | Lotfy et al. |
| 5,850,732 A | 12/1998 | Willis et al. |
| 5,867,004 A | 2/1999 | Drager et al. |
| 5,874,797 A | 2/1999 | Pinkerton |
| 5,886,450 A | 3/1999 | Kuehnle |
| 5,889,348 A | 3/1999 | Muhlberger et al. |
| 5,892,311 A | 4/1999 | Hayasaka |
| 5,893,343 A | 4/1999 | Rigazzi |
| 5,903,113 A | 5/1999 | Yamada et al. |
| 5,912,522 A | 6/1999 | Rivera |
| 5,917,295 A | 6/1999 | Mongeau |
| 5,923,111 A | 7/1999 | Eno et al. |
| 5,939,813 A | 8/1999 | Schoeb |
| 5,942,829 A | 8/1999 | Huynh |
| 5,945,766 A | 8/1999 | Kim et al. |
| 5,952,756 A | 9/1999 | Hsu et al. |
| 5,968,680 A | 10/1999 | Wolfe et al. |
| 5,973,436 A | 10/1999 | Mitcham |
| 5,982,070 A | 11/1999 | Caamano |
| 5,982,074 A | 11/1999 | Smith et al. |
| 5,990,590 A | 11/1999 | Roesel et al. |
| 5,997,252 A | 12/1999 | Miller |
| 5,998,902 A | 12/1999 | Sleder et al. |
| 5,998,969 A | 12/1999 | Tsuji et al. |
| 6,002,192 A | 12/1999 | Krivospitski et al. |
| 6,005,786 A | 12/1999 | Bluemel et al. |
| 6,014,015 A | 1/2000 | Thorne et al. |
| 6,020,711 A | 2/2000 | Rubertus et al. |
| 6,027,429 A | 2/2000 | Daniels |
| 6,032,459 A | 3/2000 | Skowronski |
| 6,034,463 A | 3/2000 | Hansson |
| 6,037,672 A | 3/2000 | Grewe |
| 6,037,696 A | 3/2000 | Sromin et al. |
| 6,043,579 A | 3/2000 | Hill |
| 6,047,104 A | 4/2000 | Cheng |
| 6,055,163 A | 4/2000 | Wagner et al. |
| 6,057,622 A | 5/2000 | Hsu |
| 6,062,016 A | 5/2000 | Edelman |
| 6,064,122 A | 5/2000 | McConnell |
| 6,065,281 A | 5/2000 | Shekleton et al. |
| 6,066,898 A | 5/2000 | Jensen |
| 6,066,906 A | 5/2000 | Kalsi |
| 6,081,053 A | 6/2000 | Maegawa et al. |
| 6,082,112 A | 7/2000 | Shekleton |
| 6,086,250 A | 7/2000 | Rouhet et al. |
| 6,087,750 A | 7/2000 | Raad |
| 6,093,293 A | 7/2000 | Haag et al. |
| 6,093,986 A | 7/2000 | Windhorn |
| 6,097,104 A | 8/2000 | Russell |
| 6,100,809 A | 8/2000 | Novoselsky et al. |
| 6,104,097 A | 8/2000 | Lehoczky |
| 6,104,115 A | 8/2000 | Offringa et al. |
| 6,105,630 A | 8/2000 | Braun et al. |
| 6,109,222 A | 8/2000 | Glezer et al. |
| 6,125,625 A | 10/2000 | Lipinski et al. |
| 6,127,758 A | 10/2000 | Murry et al. |
| 6,149,410 A | 11/2000 | Cooper |
| 6,157,107 A | 12/2000 | Aoshima et al. |
| 6,158,953 A | 12/2000 | Lamont |
| 6,166,473 A | 12/2000 | Hayasaka |
| 6,169,332 B1 | 1/2001 | Taylor et al. |
| 6,170,251 B1 | 1/2001 | Skowronski et al. |
| 6,172,429 B1 | 1/2001 | Russell |
| 6,172,440 B1 | 1/2001 | Sasaki et al. |
| 6,175,210 B1 | 1/2001 | Schwartz et al. |
| 6,177,735 B1 | 1/2001 | Chapman et al. |
| 6,178,751 B1 | 1/2001 | Shekleton et al. |
| 6,181,235 B1 | 1/2001 | Smith |
| 6,189,621 B1 | 2/2001 | Vail |
| 6,191,561 B1 | 2/2001 | Bartel |
| 6,194,802 B1 | 2/2001 | Rao |
| 6,195,869 B1 | 3/2001 | Pullen et al. |
| 6,198,174 B1 | 3/2001 | Nims et al. |
| 6,199,381 B1 | 3/2001 | Unger et al. |
| 6,199,519 B1 | 3/2001 | Van |
| 6,211,633 B1 | 4/2001 | Jones et al. |
| 6,215,206 B1 | 4/2001 | Chitayat |
| 6,218,760 B1 | 4/2001 | Sakuragi et al. |
| 6,226,990 B1 | 5/2001 | Conrad |
| 6,242,827 B1 | 6/2001 | Wolf et al. |
| 6,242,840 B1 | 6/2001 | Denk et al. |
| 6,244,034 B1 | 6/2001 | Taylor et al. |
| 6,246,138 B1 | 6/2001 | Nims |
| 6,255,743 B1 | 7/2001 | Pinkerton et al. |
| 6,269,639 B1 | 8/2001 | Conrad |
| 6,269,640 B1 | 8/2001 | Conrad |
| 6,274,945 B1 | 8/2001 | Gilbreth et al. |
| 6,274,960 B1 | 8/2001 | Sakai et al. |
| 6,275,012 B1 | 8/2001 | Jabaji |
| 6,276,124 B1 | 8/2001 | Soh et al. |
| 6,279,318 B1 | 8/2001 | Conrad |
| 6,279,319 B1 | 8/2001 | Conrad |
| 6,284,106 B1 | 9/2001 | Haag et al. |
| 6,286,310 B1 | 9/2001 | Conrad |
| 6,288,467 B1 | 9/2001 | Lange et al. |
| 6,291,901 B1 | 9/2001 | Cefo |
| 6,293,101 B1 | 9/2001 | Conrad |
| 6,294,842 B1 | 9/2001 | Skowronski |
| 6,297,977 B1 | 10/2001 | Huggett et al. |
| 6,300,689 B1 | 10/2001 | Smalser |
| 6,307,278 B1 | 10/2001 | Nims et al. |
| 6,307,717 B1 | 10/2001 | Jeong |
| 6,309,268 B1 | 10/2001 | Mabru |
| 6,311,490 B1 | 11/2001 | Conrad |
| 6,311,491 B1 | 11/2001 | Conrad |
| 6,314,773 B1 | 11/2001 | Miller et al. |
| 6,329,783 B1 | 12/2001 | Vrionis et al. |
| 6,332,319 B1 | 12/2001 | Conrad |
| 6,336,326 B1 | 1/2002 | Conrad |
| 6,339,271 B1 | 1/2002 | Noble et al. |
| 6,345,666 B1 | 2/2002 | Conrad |
| 6,348,683 B1 | 2/2002 | Verghese et al. |
| 6,362,718 B1 | 3/2002 | Patrick et al. |
| 6,363,706 B1 | 4/2002 | Meister et al. |
| 6,370,928 B1 | 4/2002 | Chies et al. |
| 6,373,162 B1 | 4/2002 | Liang et al. |
| 6,373,230 B2 | 4/2002 | Jabaji |
| 6,380,648 B1 | 4/2002 | Hsu |
| 6,384,564 B1 | 5/2002 | Pollock |
| 6,397,946 B1 | 6/2002 | Vail |
| 6,405,522 B1 | 6/2002 | Pont et al. |
| 6,407,465 B1 | 6/2002 | Peltz et al. |
| 6,411,003 B1 | 6/2002 | Sasaki et al. |
| 6,420,852 B1 | 7/2002 | Sato |
| 6,435,925 B1 | 8/2002 | Mabru |
| 6,438,937 B1 | 8/2002 | Pont et al. |

(56) References Cited

U.S. PATENT DOCUMENTS

| | | |
|---|---|---|
| 6,445,101 B2 | 9/2002 | Ley |
| 6,445,105 B1 | 9/2002 | Kliman et al. |
| 6,453,658 B1 | 9/2002 | Willis et al. |
| 6,454,920 B1 | 9/2002 | Haag et al. |
| 6,455,964 B1 | 9/2002 | Nims |
| 6,455,970 B1 | 9/2002 | Shaefer et al. |
| 6,463,730 B1 | 10/2002 | Keller et al. |
| 6,467,725 B1 | 10/2002 | Coles et al. |
| 6,470,933 B1 | 10/2002 | Volpi |
| 6,479,534 B1 | 11/2002 | Bentley et al. |
| 6,483,222 B2 | 11/2002 | Pelrine et al. |
| 6,486,640 B2 | 11/2002 | Adams |
| 6,501,195 B1 | 12/2002 | Barton |
| 6,503,056 B2 | 1/2003 | Eccles et al. |
| 6,504,281 B1 | 1/2003 | Smith et al. |
| 6,512,305 B1 | 1/2003 | Pinkerton et al. |
| 6,518,680 B2 | 2/2003 | McDavid |
| 6,526,757 B2 | 3/2003 | Mackay |
| 6,528,902 B1 | 3/2003 | Barton |
| 6,531,799 B1 | 3/2003 | Miller |
| 6,531,848 B1 | 3/2003 | Chitsazan et al. |
| 6,538,358 B1 | 3/2003 | Krefta et al. |
| 6,541,887 B2 | 4/2003 | Kawamura |
| 6,545,373 B1 | 4/2003 | Andres et al. |
| 6,546,769 B2 | 4/2003 | Miller et al. |
| 6,548,925 B2 | 4/2003 | Noble et al. |
| 6,563,717 B2 | 5/2003 | Lunding et al. |
| 6,565,243 B1 | 5/2003 | Cheung |
| 6,566,764 B2 | 5/2003 | Rebsdorf et al. |
| 6,579,137 B2 | 6/2003 | Mabru |
| 6,590,298 B1 | 7/2003 | Du |
| 6,606,864 B2 | 8/2003 | Mackay |
| 6,622,487 B2 | 9/2003 | Jones |
| 6,631,080 B2 | 10/2003 | Trimble et al. |
| 6,634,176 B2 | 10/2003 | Rouse et al. |
| 6,644,027 B1 | 11/2003 | Kelly |
| 6,647,716 B2 | 11/2003 | Boyd |
| 6,655,341 B2 | 12/2003 | Westerbeke |
| 6,657,348 B2 | 12/2003 | Qin et al. |
| 6,664,688 B2 | 12/2003 | Naito et al. |
| 6,666,027 B1 | 12/2003 | Cardenas |
| 6,669,416 B2 | 12/2003 | Klement |
| 6,672,413 B2 | 1/2004 | Moore et al. |
| 6,675,583 B2 | 1/2004 | Willis et al. |
| 6,677,685 B2 | 1/2004 | Pfleger et al. |
| 6,679,977 B2 | 1/2004 | Haag et al. |
| 6,684,642 B2 | 2/2004 | Willis et al. |
| 6,700,217 B1 | 3/2004 | North et al. |
| 6,700,248 B2 | 3/2004 | Long |
| 6,702,404 B2 | 3/2004 | Anwar et al. |
| 6,703,719 B1 | 3/2004 | McConnell |
| 6,703,747 B2 | 3/2004 | Kawamura |
| 6,710,469 B2 | 3/2004 | McDavid |
| 6,710,491 B2 | 3/2004 | Wu et al. |
| 6,710,492 B2 | 3/2004 | Minagawa |
| 6,710,502 B2 | 3/2004 | Maslov et al. |
| 6,713,936 B2 | 3/2004 | Lee |
| 6,717,313 B1 | 4/2004 | Bae |
| 6,720,688 B1 | 4/2004 | Schiller |
| 6,724,115 B2 | 4/2004 | Kusase |
| 6,727,632 B2 | 4/2004 | Kusase |
| 6,731,019 B2 | 5/2004 | Burns et al. |
| 6,732,531 B2 | 5/2004 | Dickey |
| 6,735,953 B1 | 5/2004 | Wolfe et al. |
| 6,737,829 B2 | 5/2004 | Sastry |
| 6,741,010 B2 | 5/2004 | Wilkin |
| 6,756,719 B1 | 6/2004 | Chiu |
| 6,759,775 B2 | 7/2004 | Grimm |
| 6,765,307 B2 | 7/2004 | Gerber et al. |
| 6,766,647 B2 | 7/2004 | Hartzheim |
| 6,771,000 B2 | 8/2004 | Kim et al. |
| 6,803,696 B2 | 10/2004 | Chen |
| 6,853,107 B2 | 2/2005 | Pyntikov et al. |
| 6,894,411 B2 | 5/2005 | Schmid et al. |
| 6,894,455 B2 | 5/2005 | Cai et al. |
| 6,897,595 B1 | 5/2005 | Chiarenza |
| 6,901,212 B2 | 5/2005 | Masino |
| 6,956,313 B2 | 10/2005 | El-Gabry et al. |
| 6,969,927 B1 | 11/2005 | Lee |
| 7,002,259 B2 | 2/2006 | Howes et al. |
| 7,081,696 B2 | 7/2006 | Ritchey |
| 7,102,248 B2 | 9/2006 | Wobben |
| 7,119,513 B2 | 10/2006 | Ishikawa |
| 7,126,312 B2 | 10/2006 | Moore |
| 7,193,391 B2 | 3/2007 | Moore |
| 7,239,098 B2 | 7/2007 | Masino |
| 7,248,006 B2 | 7/2007 | Bailey et al. |
| 7,250,702 B2 | 7/2007 | Abou et al. |
| 7,348,764 B2 | 3/2008 | Stewart et al. |
| 7,382,103 B2 | 6/2008 | Shirazee et al. |
| 7,391,180 B2 | 6/2008 | Armiroli et al. |
| 7,400,077 B2 | 7/2008 | Caroon |
| 7,405,490 B2 | 7/2008 | Moehlenkamp |
| 7,427,849 B2 | 9/2008 | Kaneko |
| 7,482,708 B1 | 1/2009 | Barton et al. |
| 7,514,834 B2 | 4/2009 | Takeuchi |
| 7,525,285 B2 | 4/2009 | Plett |
| 7,545,052 B2 | 6/2009 | Llorente et al. |
| 7,554,303 B1 | 6/2009 | Kawamura |
| 7,595,574 B2 | 9/2009 | Ritchey |
| 7,602,158 B1 | 10/2009 | Iacob |
| 7,649,274 B2 | 1/2010 | Burt |
| 7,710,081 B2 | 5/2010 | Saban et al. |
| 7,816,805 B2 | 10/2010 | Tanaka et al. |
| 7,948,141 B2 | 5/2011 | Takeuchi |
| 8,097,970 B2 | 1/2012 | Hyvaerinen |
| 8,106,563 B2 | 1/2012 | Ritchey |
| 8,138,620 B2 | 3/2012 | Wagoner et al. |
| 8,212,371 B2 | 7/2012 | Maibach et al. |
| 8,212,445 B2 | 7/2012 | Ritchey |
| 8,288,992 B2 | 10/2012 | Kramer et al. |
| 8,426,063 B2 | 4/2013 | Lin |
| 8,427,105 B2 | 4/2013 | Plett |
| 8,466,595 B2 | 6/2013 | Spooner |
| 8,470,464 B2 | 6/2013 | Troutman |
| 8,564,247 B2 | 10/2013 | Hintz et al. |
| 8,577,529 B2 | 11/2013 | Takahashi et al. |
| 8,610,383 B2 | 12/2013 | De Sousa et al. |
| 8,614,529 B2 | 12/2013 | Ritchey |
| 8,614,563 B2 | 12/2013 | Baughman |
| 8,685,563 B1 | 4/2014 | Lin |
| 8,729,861 B2 | 5/2014 | Nishida et al. |
| 8,796,993 B2 | 8/2014 | White et al. |
| 8,798,832 B2 | 8/2014 | Kawahara et al. |
| 8,823,296 B2 | 9/2014 | De Sousa et al. |
| 8,917,155 B2 | 12/2014 | Adachi et al. |
| 8,928,282 B2 | 1/2015 | Kudo et al. |
| 8,988,045 B2 | 3/2015 | Klein et al. |
| 9,024,586 B2 | 5/2015 | Vance et al. |
| 9,054,533 B2 | 6/2015 | Gaul et al. |
| 9,093,864 B2 | 7/2015 | Abe et al. |
| 9,130,377 B2 | 9/2015 | Barsukov et al. |
| 9,147,910 B2 | 9/2015 | Chuah et al. |
| 9,153,845 B2 | 10/2015 | Tanaka et al. |
| 9,197,081 B2 | 11/2015 | Finberg et al. |
| 9,230,730 B2 | 1/2016 | Heins |
| 9,395,420 B2 | 7/2016 | White et al. |
| 9,450,274 B2 | 9/2016 | Vo et al. |
| 9,496,727 B2 | 11/2016 | Liu et al. |
| 9,520,613 B2 | 12/2016 | Brockerhoff |
| 9,564,763 B2 | 2/2017 | Finberg et al. |
| 9,579,961 B2 | 2/2017 | Harris |
| 9,669,726 B2 | 6/2017 | Luo et al. |
| 9,705,340 B2 | 7/2017 | Lucea |
| 9,787,107 B2 | 10/2017 | Lutze et al. |
| 9,812,981 B2 | 11/2017 | Ritchey et al. |
| 9,885,757 B2 | 2/2018 | Liu et al. |
| 9,960,611 B2 | 5/2018 | Toya |
| 9,979,211 B2 | 5/2018 | Barsukov et al. |
| 10,069,313 B2 | 9/2018 | Tkachenko et al. |
| 10,073,128 B2 | 9/2018 | Yoshioka et al. |
| 10,074,997 B2 | 9/2018 | Vo et al. |
| 10,103,591 B2 | 10/2018 | Heins |
| 10,147,983 B2 | 12/2018 | Kawahara et al. |

(56) References Cited

U.S. PATENT DOCUMENTS

| | | |
|---|---|---|
| 10,222,428 B2 | 3/2019 | Saint-Marcoux et al. |
| 10,232,716 B2 | 3/2019 | Higuchi et al. |
| 10,256,643 B2 | 4/2019 | Toya |
| 10,263,435 B2 | 4/2019 | Kim et al. |
| 10,277,041 B2 | 4/2019 | Zane et al. |
| 10,291,162 B1 | 5/2019 | Heins |
| 10,298,026 B2 | 5/2019 | Trimboli et al. |
| 10,305,298 B2 | 5/2019 | Kristensen |
| 10,305,409 B2 | 5/2019 | Wang et al. |
| 10,330,732 B2 | 6/2019 | Roumi et al. |
| 10,483,791 B2 | 11/2019 | Mergener et al. |
| 10,483,899 B2 | 11/2019 | Hustedt |
| 10,543,303 B2 | 1/2020 | Zilbershlag et al. |
| 10,561,775 B2 | 2/2020 | Zilbershlag |
| 10,644,537 B2 | 5/2020 | Krishnan et al. |
| 10,778,014 B2 | 9/2020 | Barsukov et al. |
| 10,833,512 B2 | 11/2020 | Remboski et al. |
| 10,958,075 B2 | 3/2021 | Collins et al. |
| 10,958,083 B2 | 3/2021 | Halsey |
| 10,985,552 B2 | 4/2021 | Tada et al. |
| 10,985,587 B2 | 4/2021 | Matsumura et al. |
| 10,992,146 B2 | 4/2021 | Flowers et al. |
| 11,005,276 B2 | 5/2021 | Lee et al. |
| 11,095,148 B2 | 8/2021 | Mergener |
| 11,128,153 B1 | 9/2021 | Cho et al. |
| 11,133,680 B2 | 9/2021 | Wang et al. |
| 11,171,494 B2 | 11/2021 | Tang et al. |
| 11,277,012 B2 | 3/2022 | Ono et al. |
| 11,336,104 B2 | 5/2022 | Poland et al. |
| 2002/0012261 A1 | 1/2002 | Moindron |
| 2002/0047418 A1 | 4/2002 | Seguchi et al. |
| 2002/0057030 A1 | 5/2002 | Fogarty |
| 2002/0070707 A1 | 6/2002 | Sato |
| 2003/0047209 A1 | 3/2003 | Yanai et al. |
| 2004/0021437 A1 | 2/2004 | Maslov et al. |
| 2004/0037221 A1 | 2/2004 | Aisa |
| 2004/0174652 A1 | 9/2004 | Lewis |
| 2004/0232796 A1 | 11/2004 | Weissensteiner |
| 2004/0251761 A1 | 12/2004 | Hirzel |
| 2005/0013085 A1 | 1/2005 | Kinsella et al. |
| 2005/0024015 A1 | 2/2005 | Houldsworth et al. |
| 2005/0099314 A1 | 5/2005 | Aisa |
| 2005/0184689 A1 | 8/2005 | Maslov et al. |
| 2005/0212487 A1 | 9/2005 | Sodeno |
| 2005/0248440 A1 | 11/2005 | Stevens |
| 2005/0269989 A1 | 12/2005 | Geren et al. |
| 2005/0280264 A1 | 12/2005 | Nagy |
| 2006/0022639 A1 | 2/2006 | Moore |
| 2006/0033475 A1 | 2/2006 | Moore |
| 2006/0056127 A1 | 3/2006 | Lewis |
| 2006/0097698 A1 | 5/2006 | Plett |
| 2006/0232069 A1 | 10/2006 | Lim et al. |
| 2006/0273766 A1 | 12/2006 | Kawamura |
| 2007/0073445 A1 | 3/2007 | Llorente et al. |
| 2007/0182273 A1 | 8/2007 | Burt |
| 2007/0210733 A1 | 9/2007 | Du et al. |
| 2008/0012538 A1 | 1/2008 | Stewart et al. |
| 2008/0088200 A1 | 4/2008 | Ritchey |
| 2008/0106100 A1 | 5/2008 | Hyvarinen |
| 2008/0116759 A1 | 5/2008 | Lin |
| 2008/0266742 A1 | 10/2008 | Henke et al. |
| 2009/0066291 A1 | 3/2009 | Tien et al. |
| 2009/0078481 A1 | 3/2009 | Harris |
| 2009/0167247 A1 | 7/2009 | Bai et al. |
| 2009/0208837 A1 | 8/2009 | Lin |
| 2009/0251100 A1 | 10/2009 | Incledon et al. |
| 2009/0267414 A1 | 10/2009 | Kiyohara et al. |
| 2010/0019593 A1 | 1/2010 | Ritchey |
| 2010/0073970 A1 | 3/2010 | Abolhassani et al. |
| 2010/0090553 A1 | 4/2010 | Ritchey |
| 2010/0164437 A1 | 7/2010 | McKinley et al. |
| 2010/0207580 A1 | 8/2010 | Nishida et al. |
| 2010/0244781 A1 | 9/2010 | Kramer et al. |
| 2010/0244847 A1 | 9/2010 | Kudo et al. |
| 2010/0261048 A1 | 10/2010 | Kim et al. |
| 2010/0305792 A1 | 12/2010 | Wilk et al. |
| 2011/0057617 A1 | 3/2011 | Finberg et al. |
| 2011/0078470 A1 | 3/2011 | Wang et al. |
| 2011/0089897 A1 | 4/2011 | Zhang et al. |
| 2011/0127960 A1 | 6/2011 | Plett |
| 2011/0169454 A1 | 7/2011 | Maruyama et al. |
| 2011/0241630 A1 | 10/2011 | Ritchey et al. |
| 2011/0260687 A1 | 10/2011 | Kudo et al. |
| 2011/0266806 A1 | 11/2011 | Numajiri |
| 2012/0013304 A1 | 1/2012 | Murase et al. |
| 2012/0065824 A1 | 3/2012 | Takahashi et al. |
| 2012/0074898 A1 | 3/2012 | Schwartz |
| 2012/0091964 A1 | 4/2012 | Vance et al. |
| 2012/0094150 A1 | 4/2012 | Troutman |
| 2012/0194403 A1 | 8/2012 | Cordier et al. |
| 2012/0206105 A1 | 8/2012 | Nishizawa et al. |
| 2012/0229060 A1 | 9/2012 | Ritchey et al. |
| 2012/0256592 A1 | 10/2012 | Baughman |
| 2012/0274331 A1 | 11/2012 | Liu et al. |
| 2013/0002201 A1 | 1/2013 | Bodkin et al. |
| 2013/0026989 A1 | 1/2013 | Gibbs et al. |
| 2013/0026993 A1 | 1/2013 | Hintz et al. |
| 2013/0033231 A1 | 2/2013 | Zhang |
| 2013/0065093 A1 | 3/2013 | White et al. |
| 2013/0069598 A1 | 3/2013 | Tanaka et al. |
| 2013/0169234 A1 | 7/2013 | Chuah et al. |
| 2014/0015488 A1 | 1/2014 | Despesse |
| 2014/0021924 A1 | 1/2014 | Abe et al. |
| 2014/0077752 A1 | 3/2014 | Barsukov et al. |
| 2014/0103850 A1* | 4/2014 | Frank .................. H02K 11/33 310/198 |
| 2014/0145684 A1 | 5/2014 | Liu et al. |
| 2014/0167708 A1 | 6/2014 | Ritchey |
| 2014/0167780 A1 | 6/2014 | White et al. |
| 2014/0252922 A1 | 9/2014 | Ritchey et al. |
| 2014/0253271 A1 | 9/2014 | Heins |
| 2014/0287278 A1 | 9/2014 | Despesse |
| 2014/0312828 A1 | 10/2014 | Vo et al. |
| 2014/0327407 A1 | 11/2014 | Lucea |
| 2014/0347903 A1 | 11/2014 | Ritchey et al. |
| 2014/0361743 A1 | 12/2014 | Lin et al. |
| 2014/0368168 A1 | 12/2014 | Beckman |
| 2015/0028817 A1 | 1/2015 | Brockerhoff |
| 2015/0219721 A1 | 8/2015 | Yang et al. |
| 2015/0231985 A1 | 8/2015 | Li |
| 2015/0380959 A1 | 12/2015 | Chang et al. |
| 2016/0043579 A1 | 2/2016 | Finberg et al. |
| 2016/0072316 A1 | 3/2016 | Barsukov et al. |
| 2016/0105042 A1 | 4/2016 | Taylor et al. |
| 2016/0111900 A1 | 4/2016 | Beaston et al. |
| 2016/0134210 A1 | 5/2016 | Bock et al. |
| 2016/0190830 A1 | 6/2016 | Kuhlmann et al. |
| 2016/0336764 A1 | 11/2016 | Becker et al. |
| 2016/0336765 A1 | 11/2016 | Trimboli et al. |
| 2016/0336767 A1 | 11/2016 | Zane et al. |
| 2016/0351976 A1 | 12/2016 | Kawahara et al. |
| 2017/0016961 A1 | 1/2017 | Lucea |
| 2017/0054306 A1 | 2/2017 | Vo et al. |
| 2017/0104347 A1 | 4/2017 | Shimonishi et al. |
| 2017/0214253 A1 | 7/2017 | Kim et al. |
| 2017/0264110 A1 | 9/2017 | Toya |
| 2017/0299660 A1 | 10/2017 | Saint-Marcoux et al. |
| 2017/0346334 A1 | 11/2017 | Mergener et al. |
| 2018/0008760 A1 | 1/2018 | Zilbershlag et al. |
| 2018/0019694 A1 | 1/2018 | Spickard |
| 2018/0056798 A1 | 3/2018 | Syouda |
| 2018/0062402 A1 | 3/2018 | Syouda |
| 2018/0123357 A1 | 5/2018 | Beaston et al. |
| 2018/0219390 A1 | 8/2018 | Tkachenko et al. |
| 2018/0226810 A1 | 8/2018 | Barsukov et al. |
| 2018/0241227 A1 | 8/2018 | Halsey |
| 2018/0278146 A1 | 9/2018 | Guven et al. |
| 2018/0301929 A1 | 10/2018 | Krishnan et al. |
| 2018/0339093 A1 | 11/2018 | Zilbershlag |
| 2018/0366959 A1 | 12/2018 | Coenen |
| 2019/0103750 A1 | 4/2019 | Kristensen |
| 2019/0148952 A1 | 5/2019 | Remboski et al. |
| 2019/0229540 A1 | 7/2019 | Lee et al. |
| 2019/0273380 A1 | 9/2019 | Collins et al. |

(56) References Cited

U.S. PATENT DOCUMENTS

| | | |
|---|---|---|
| 2019/0280488 A1 | 9/2019 | Tang et al. |
| 2019/0299799 A1 | 10/2019 | Hinterberger et al. |
| 2019/0393696 A1 | 12/2019 | Tada et al. |
| 2020/0036047 A1 | 1/2020 | Aikens et al. |
| 2020/0044459 A1 | 2/2020 | Lee et al. |
| 2020/0052524 A1 | 2/2020 | Mergener et al. |
| 2020/0099110 A1 | 3/2020 | Lin |
| 2020/0203961 A1 | 6/2020 | Flowers et al. |
| 2020/0220364 A1 | 7/2020 | Wang et al. |
| 2020/0244076 A1 | 7/2020 | Wang et al. |
| 2020/0274203 A1 | 8/2020 | Kirleis et al. |
| 2020/0274368 A1 | 8/2020 | Crouse |
| 2020/0274371 A1 | 8/2020 | Kirleis et al. |
| 2020/0274386 A1 | 8/2020 | Kirleis et al. |
| 2020/0321788 A1 | 10/2020 | Ono et al. |
| 2020/0412159 A1 | 12/2020 | Snyder et al. |
| 2021/0013784 A1 | 1/2021 | Shirazee |
| 2021/0044119 A1 | 2/2021 | Poland et al. |
| 2021/0075230 A1 | 3/2021 | Ono et al. |
| 2021/0098996 A1 | 4/2021 | Ono et al. |
| 2021/0098998 A1 | 4/2021 | Eo |
| 2021/0234380 A1 | 7/2021 | Ono et al. |
| 2021/0249873 A1 | 8/2021 | Despesse et al. |
| 2021/0273461 A1 | 9/2021 | Lin et al. |
| 2021/0296912 A1 | 9/2021 | Cho et al. |
| 2021/0302505 A1 | 9/2021 | Worry et al. |
| 2021/0313830 A1 | 10/2021 | Dowler et al. |
| 2022/0060029 A1 | 2/2022 | Syouda et al. |

FOREIGN PATENT DOCUMENTS

| | | |
|---|---|---|
| CA | 1038918 A | 9/1978 |
| CA | 2341095 A1 | 10/2001 |
| CA | 2459126 A1 | 4/2003 |
| CA | 2543354 C | 12/2014 |
| CN | 1082740 C | 4/2002 |
| CN | 101582672 A | 11/2009 |
| CN | 102148111 | 8/2011 |
| CN | 102148111 A | 8/2011 |
| CN | 102484448 A | 5/2012 |
| CN | 202841012 U | 3/2013 |
| CN | 107683554 A | 2/2018 |
| DE | 19733208 C1 | 10/1998 |
| EP | 0603778 A1 | 6/1994 |
| EP | 0613234 B1 | 11/2001 |
| EP | 1416604 A2 | 5/2004 |
| EP | 1413046 B1 | 5/2006 |
| EP | 1717946 A2 | 11/2006 |
| EP | 1068663 B1 | 5/2008 |
| EP | 1680861 B1 | 1/2009 |
| EP | 2797221 A1 | 10/2014 |
| JP | 2001161098 A | 6/2001 |
| JP | 2001204198 A | 7/2001 |
| JP | 2004336836 A | 11/2004 |
| JP | 2006521781 A | 9/2006 |
| JP | 2007097341 A | 4/2007 |
| JP | 2009080093 A | 4/2009 |
| JP | 4790618 B2 | 7/2011 |
| JP | 2013247003 A | 12/2013 |
| JP | 5798015 B2 | 8/2015 |
| KR | 1020070082819 | 8/2007 |
| KR | 102066323 B1 | 1/2020 |
| SE | 9701662 | 6/1998 |
| WO | 8100651 A1 | 3/1981 |
| WO | 8807782 A1 | 10/1988 |
| WO | 9708009 A1 | 3/1997 |
| WO | 9808291 A1 | 2/1998 |
| WO | 2004001949 A1 | 12/2003 |
| WO | 2004004109 A2 | 1/2004 |
| WO | 2004088832 A1 | 10/2004 |
| WO | 2005043740 A2 | 5/2005 |
| WO | 2007098227 A2 | 8/2007 |
| WO | 2008067649 A2 | 6/2008 |
| WO | 2008091035 A1 | 7/2008 |
| WO | 2008119864 A1 | 10/2008 |
| WO | 2010057892 A1 | 5/2010 |
| WO | 2010057893 A1 | 5/2010 |
| WO | 2013155601 A1 | 10/2013 |
| WO | 2018213919 A1 | 11/2018 |
| WO | 2020047663 A1 | 3/2020 |
| WO | 2021094744 A1 | 5/2021 |

OTHER PUBLICATIONS

International Search Report and Written Opinion dated Sep. 21, 2022 in PCT/CA2022/050620, 17 pages.
Non Final Office Action for U.S. Appl. No. 17/727,143, dated Aug. 22, 2022, 28 pages.
Eckart Nipp, "Alternative to Field-Weakening of Surface-Mounted Permanent-magnet Motors for Variable-Speed Drives", IEEE Xplore 1995, 8 pages.
Huang, et al., "Electrical Two-Speed Propulsion by Motor Winding Switching and Its Control Strategies for Electric Vehicles" IEEE transactions on Vehicular Technology, vol. 48, No. 2, Mar. 1999, 12 pages.
Tang, et al., "A Reconfigurable-Winding System for Electric Vehicle Drive Applications", 2017 IEEE Transportation Electrification Conference and Expo (ITEC), 6 pages.
Tang, "Electric Motor Performance Improvement Techniques", 2016 U.S. DOE Vehicle Technologies Office Review, Project ID:EDT071, Oak Ridge National Laboratory, 23 pages.
"New Motor architecture could be a game-changer", High Power Media Ltd., E-Mobility Engineering, 2021, 6 pages.
"Single Wound and Dual Winding Motor", Yaskawa America, Models & Ratings, 220v Motor/400V Motor, Standard 200V Series.
"What is Dynamic Torque Switching?", Info@epropelled.com, 4 pages.
Anders, "Analysis of a gas turbine driven hybrid drive system for heavy vehicles", Thesis/Dissertation, Etdeweb, U.S. Department of Energy Office of Scientific and Technical Information, Jul. 1, 1999, 4 pages.
Canadian Examination Report, dated Mar. 3, 2017, for CA 2,773,102, 4 pages.
Canadian Examination Report, dated Nov. 1, 2017, for CA 2,773,040, 4 pages.
Canadian Office Action, for Canadian Application No. 2,487,668, dated Oct. 6, 2011, 4 pages.
Canadian Office Action, for Canadian Application No. 3,061,619, dated Sep. 2, 2021, 4 pages.
Eckart Nipp, "Permanent Magnet Motor Drives with Switched Stator Windings", Kungl Tekniska Hogskolan, TRITA-EMD-9905 ISSN-1102-0172, Submitted to the School of Electric Engineering and Information Technology, 1999, 315 pages.
European Examination Report, dated Apr. 18, 2017, for EP 10 814 529.3, 6 pages.
Extended European Search Report, dated Oct. 14, 2020, for EP 18806122, 7 pages.
First Office Action and Search Report (with English Translation) from corresponding CN application No. 201080039251.0, dated Jan. 30, 2014, 16 pages.
International Preliminary Report on Patentability and Written Opinion, dated Mar. 6, 2012, for PCT/US2010/047750, 5 pages.
International Preliminary Report on Patentability with Written Opinion dated Nov. 26, 2019, for International Application No. PCT/CA2018/050222, filed Feb. 27, 2018, 6 pages.
International Search Report and Written Opinion, dated Jun. 2, 2020, for PCT/CA2020/050534, 10 pages.
International Search Report and Written Opinion, dated May 24, 2011, for PCT/US2010/047750, 7 pages.
International Search Report and Written Opinion, dated May 8, 2018, for PCT/CA2018/050222, 7 pages.
International Search Report and Written Opinion, dated Nov. 13, 2019, for PCT/CA2019/051239, 9 pages.
International Search Report and Written Opinion, dated Oct. 6, 2020, in PCT/IB2020/056080, 10 pages.
International Search Report and Written Opinion, dated Sep. 28, 2007, for PCT/CA2007/001040, 8 pages.

(56) References Cited

OTHER PUBLICATIONS

International Search Report for PCT/CA2020/050534, dated Jun. 2, 2020, 4 pages.
Jianqiang Wang et al., "Study of High-capacity Single-body Li-ion Battery Charging and Discharging System," (PEDS) Nov. 2, 2009, pp. 46-48.
Luis Orozco et al., "Power Efficient Battery Formation/Testing System with Energy Recycling," Analog Devices, 4 pages.
Notice of Allowance dated Jun. 15, 2021, for Ritchey, "Variable Coil Configuration System Control, Apparatus and Method," U.S. Appl. No. 16/615,493, 10 pages.
Written Opinion for PCT/CA2020/050534, dated Jun. 2, 2020, 6 pages.
Villani M., et al., "Fault-tolerant brushless DC drive for aerospace application. In the XIX International Conference on Electrical Machines—ICEM 2010, Sep. 6", 1-7.
International Search Report and Written Opinion dated Jul. 12, 2022 in PCT/CA2022/050620, 15 pages.
Maslov, et al. "Low-Speed High-Torque Brushless PM Motor for Propulsion Applicatins With an Advanced Magentic Path Design," U.S. Appl. No. 60/399,415, filed Jul. 31, 2002, 18 pages.
Non Final Office Action for U.S. Appl. No. 17/842,217, dated Aug. 8, 2022, 25 pages.

\* cited by examiner

FAULT TOLERANT ROTATING ELECTRIC MACHINE

BACKGROUND

Technical Field

The present disclosure relates generally to systems and methods for making rotating electric machines fault tolerant, and specifically systems and methods that enable a compromised rotating electric machine to operate in a degraded condition through a process of isolating coils and/or circuitry that are compromised.

Description of the Related Art

Rotating electric machines either convert mechanical energy into electrical energy (generator mode) or convert electrical energy into mechanical energy in the form of rotational torque (motor mode).

Permanent Magnet ("PM") machines have additional challenges when faults occur as rotating magnetic fields will induce voltages in the stator windings and produce currents according to Faraday's law. Unlike induction machines or other machine designs that don't use permanent magnets, PM machines are unable to simply turn off the magnetic fields by stopping the excitation currents.

When a short occurs in an electric motor or generator winding, the load resistance between shorted points of the winding becomes only the resistance of the conductor itself. The electrical currents produced can be significant and are often unmanageable by the system due to unsustainable heat rise. Such shorted conditions often render the machine inoperable, and if operation is not discontinued quickly, dangers such as risk of fire are not uncommon.

Where permanent magnets continue to create a changing flux through the coils of the machine, the machine will continue to induce currents that tend to oppose the change in flux created by the rotating magnetic fields. The result is that where there is a changing magnetic field (the rotor is still turning), electrical currents will continue to be generated.

While technology exists that attempts to address this problem, the known systems are limited in the benefits that they provide. Where the machine may be rendered "safe", as seen in U.S. Pat. No. 8,278,858, the machine can no longer continue to provide its primary function. Regardless of if the machine is to operate as a generator, a motor, or both, it can be easily seen how the loss of operations for such a machine could have catastrophic implications. Aerospace applications make the point self-evident as to why continued operations are so critical.

If a shorted winding condition occurs in a PM generator, the winding will continue to draw energy until the generator is stopped. For high-speed generators, this may represent a long enough duration to incur further significant damage to electrical and mechanical components. It could also mean a safety hazard for individuals working in the vicinity. The induction generator, on the other hand, is safely shut down by de-excitation preventing hazardous situations and potential damage to the unit. In either scenario, the system must be completely shut down until it can be repaired, causing unwanted downtime at potentially very inopportune times.

A variety of techniques have been developed to attempt to deal with the described challenges of shorts in rotating electric machines. Some of these innovations are designed to simply stop the rotor from turning, and use various means to physically disconnect the shaft that turns the rotor from whatever source is driving the machine's rotation.

This design can be highly problematic as the process can be slow and more than enough time can pass to cause serous damage before the machine can come to a stop.

More preferred systems attempt to manage the situation electrically rather than mechanically. This provides benefits of faster response times which may save the machine from serious damage. These systems use specialized winding schemes and means to drive current such that there is a counter to the effects of induction generated by the rotating magnetic fields. Other versions of existing technology, e.g. as described in U.S. Pat. Nos. 7,777,384 and 7,443,070, focus on the use of shunts to direct flux away from the machine coils when a faulted condition occurs.

U.S. Pat. No. 8,278,858, mentioned above, discloses a means to counter the effects of a shorted winding, but again, as is the case with other known technologies, the machine is rendered inoperable as a result of employing the techniques designed to stop the machine from causing damage or becoming dangerous.

Where other technologies look to disable functions of the machine in order to make it safe, in many cases, disabling the machine is not at all a desired option. Even if rendered "safe", the machine primary purpose can no longer be served.

BRIEF SUMMARY

Embodiments of a fault tolerant rotating electric machine as described herein are capable of isolating specific coils within the machine that might be compromised, while allowing the other elements of the machine to continue to operate as intended. While the rotating electric machine may be operating with a diminished total capacity, that is preferable to the rotating electric machine being rendered useless due to a shorted condition.

The disclosed technology describes how a faulted winding condition in a rotating electric machine can be provided with the ability to counter the negative effects of the fault, while allowing the rotating electric machine to continue operate.

In order to affect the desired operational state for one or more of the coils in the rotating electric machine, a specific type of winding may be used. Rather than a typical rotating electric machine winding that might have one conductor producing all the ampere turns around the stator tooth, two or more conductors may be used. Those conductors may be reconfigured to affect the desired functions.

Coils of the rotating electric machine may all be isolated and managed as independent elements, or coils may be grouped according to the machine type and the desired fault management capabilities. According to one implementation, each coil of the rotating electric machine has windings divided into two conductors, which both wrap around the stator tooth core with, for example, an equal number of turns.

There are numerous ways to wind coils on the stator cores which will allow implementation of the technology, and the technology may be applied to concentrated or distributed windings.

According to one embodiment, the total length of wire to be used for the coil may be divided into two equal lengths. Those conductors may be wound one after the other (referred to herein as end-to-end), or, the two conductors may be wound side-by-side around the stator tooth. Both techniques have benefits and drawbacks. Winding the conductors in pairs makes manufacture a little easier, due to the requirement of only having to wind half as many turns for each coil in the machine.

In normal operations, where there are no faults of concern, all the windings on each tooth may be configured in series such that the conductor will function as would a single primary winding and would as well operate in that same fashion given very similar properties for resistance, inductance and capacitance.

The two or more conductors on each coil may be tied together in up to three different ways so as to provide the benefits offered by the design. However, for the purposes of creating a fault tolerant rotating electric machine, as few as two modes of operation may be implemented. Normal operation includes the series winding configuration which maintains current flow in the same direction for both conductors, while the alternate "inductive cancelation" mode reconfigures those windings as what is sometimes referred to as a hairpin bifilar winding. The third winding option is a parallel winding configuration for the two or more conductors, and may or may not be incorporated into the design. The parallel winding may provide material value through providing a significantly expanded operating capability for the rotating electric machine. Essentially it will act like an electrical "gear" that alters the speed torque profile for the rotating electric machine, and thus it will be described as part of the system moving forward.

In the inductive cancelation mode, the inductive value of the winding is dramatically reduced (almost entirely removed). Where a coil/inductor has limited or no inductive properties, it will not act like an inductor but rather more like a conductor of wire with no ampere turns. While a straight wire still has an inductive value, it is far diminished in its ability to produce the effects expected of a coil of wire with a material inductance value.

A prototype of the technology was built and measurements where recorded. The default winding equivalent configuration of the two windings in "series" provided the same inductive values as the single winding rotating electric machine without the fault tolerance capability. The series connected winding had an inductance value of 785 uH. By contrast, when the winding is switched into a hairpin bifilar, to engage the "inductive cancelation" mode, the inductance value of the winding dropped dramatically to only 1.04 uH.

As indicated, the coils may be wound in numerous ways, and the alternate techniques have varied effects. In contrast to the windings being applied one after the other (end-to-end), an alternate scheme is to have the two conductors right beside each other where they are wound as a pair on the stator teeth (side-by-side).

While an "ideal" inductor has no capacitance, there is no such thing as an ideal inductor as all inductors act like capacitors as well. Any real inductor can be thought of an ideal inductor that has a resistor in series with it (wire resistance) and a capacitor in parallel with it, creating parasitic capacitance.

The coils themselves create the capacitive effect due to the side-by-side windings of the turns having an insulative material between them. The bifilar winding types provide an ability to alter some core attributes of the windings which may be beneficial given one machine design or another. Resonance frequencies, capacitive values and other variables can be modified. Specifically, the bifilar winding tends to minimize leakage inductance Lk, but at the same time produce a higher winding-to-winding capacitance.

As the frequency increases, the impedance of the inductor increases while the impedance of the parasitic capacitance decreases. The inductor also has its own resonance frequency, which can be modified through this winding technique. A selected configuration of the windings may be further optimized through various known cancellation and compensation techniques. For example, if the machine's selected operating mode produces detrimental parasitic capacitance, a capacitive compensation circuit may be used.

Where the parallel winding configuration is used, the system may require additional feedback from the fault tolerance control circuit to the drive. This is due to the dramatic change in machine characteristics for a series winding versus a parallel winding. The two winding configurations will produce different speed/torque profiles given the same inputs from the drive. A new speed reference signal can be provided to the drive as part of the switching sequence so as to maintain machine speed upon a switching event.

Further, an instantaneous switching event could cause material electrical and mechanical transients. Therefore, when switching between the series and parallel configurations, switching considerations may need to be implemented.

Once such circuits, processors, microcontroller and other structures to allow a smooth transition from one operating state to another, would be to quickly ramp the power down from the drive, execute the switching event, and then ramp the power back up, which can all be done in a small fraction of a second to ensure a smooth transition between operating states. As well, various known voltage and current transient control techniques may be employed to manage the switching event.

In order to implement the desired operations, the output terminals from the selected windings may be connected to any number of switching means. Coils may be managed as individual inductive elements or alternatively they may be grouped and managed as subsets of the rotating electric machine's larger collective of windings. Rather than having to provide switches for each of many individual coils, numerous coils can be grouped and managed as a smaller collective of coils. This can significantly reduce the component requirements and system costs, and as well as can provide benefits in ensuring a balanced system should a fault occur. Rather than a single inoperable coil, a balanced set of three coils where one coil from each phase is rendered inoperable may be preferred. Those three coils would ideally by equally physically spaced around the stator, such as at 120 degree offsets. This will help to ensure both mechanical and electrical balance for the de-rated rotating electric machine as it continues to operate.

In a typical application of the technology for a multi-coil three-phase PM rotating electric machine, the coils of the phases are divided into what is effectively numerous smaller three phase machines all on the same stator. One coil from each phase is wound together with a common neutral point. The PM rotating electric machine many have any number of three phase subsets wound as a collective depending upon the machine architecture and the desired functionality.

Control elements must be incorporated into the design such that sensor feedback is provided for the microcontroller to monitor all relevant aspects of machine operations. When an alternate operating state is desired for the rotating electric machine as identified by the system, the algorithm will employ the appropriate response to allow continued operations.

As an additional level of redundancy, the fault tolerant enabled rotating electric machine may be coupled with a fault tolerant enabled motor drive. One such system for driving a three-phase motor, might have four inverter legs, rather than only the three used for typical operations. Should one of the inverter legs become compromised for any reason, the system would swap out that phase with the fourth redundant inverter leg in order to maintain operations. This approach addressed the risk of rotating electric machine failure from a "system" perspective and provides another level of protection from critical failures.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with rotating electric machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "an embodiment," or "an aspect of the disclosure" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Figure 1:
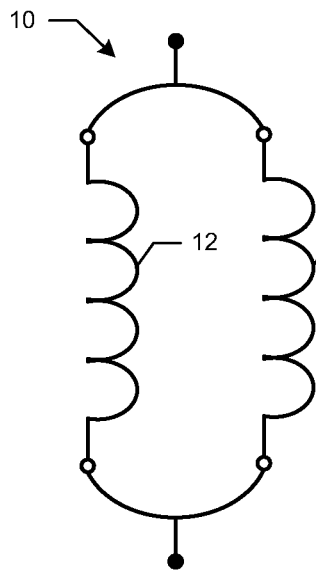
FIG. 1 is a schematic of two conductors connected in a parallel configuration.
Figure 2:
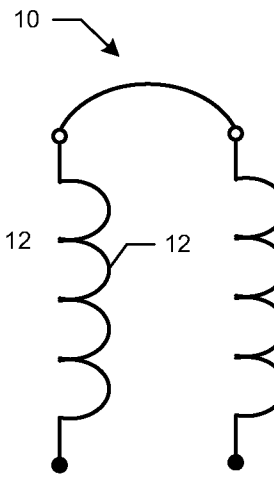
FIG. 2 is a schematic of two conductors connected in a hairpin bifilar winding scheme.
Figure 3:
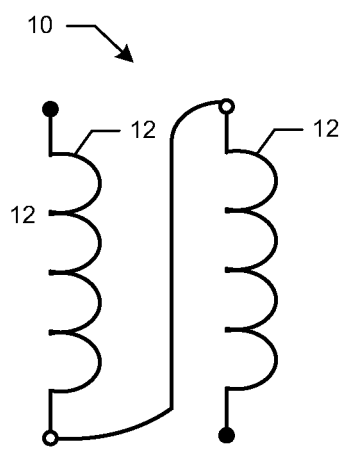
FIG. 3 is a schematic of two conductors connected in series.

Referring to FIGS. 1 to 3, there are a plurality of schemes in which an electrical system 10 may be wired, given a shorting event, or if there is a desire to engage an alternate machine characteristic offered by the particular winding scheme. As shown in FIG. 1, conductors 12 of the electrical system 10 may be connected in a parallel configuration. As shown in FIG. 2, the conductors 12 may be connected with a hairpin bifilar winding scheme that effects an inductive cancelation mode for a shorted winding. As shown in FIG. 3, the conductors 12 may be connected with a series winding, which may be a default for the electrical system 10, in which current continues to flow in the same direction around a coil such that the two windings function as a single primary winding.

Figure 4:
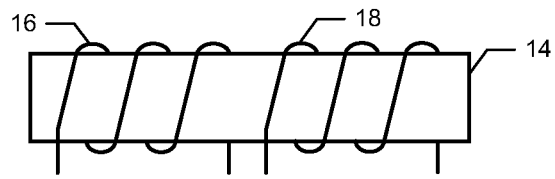
FIG. 4 is a schematic of two windings applied to a single stator tooth, according to one implementation.
Figure 5:
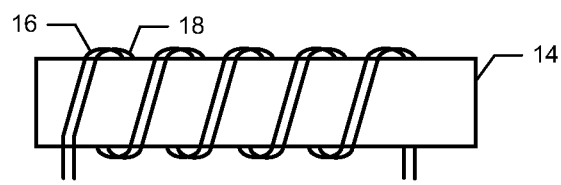
FIG. 5 is a schematic of two windings applied to a single stator tooth, according to another implementation.

Referring to FIGS. 4 and 5, there are a plurality of schemes for applying winding(s) to a stator tooth 14. As shown in FIG. 4, a first coil 16 is wound around the stator tooth 14, and then a second coil 18 is wound around the stator tooth 14 such that where the first coil 16 ends, the second coil 18 begins resulting in an end-to-end wrapping. As shown in FIG. 5, two separate conductors are positioned side-by-side and wrapped together around the stator tooth 14 to form the first coil 16 and the second coil 18. This side-by-side wrapping may provide benefits such as using only half the number of turns as used in the end-to-end (FIG. 4) scheme. Additionally, the tight winding proximity of the side-by-side wrapping may result in unique attributes of the electric system 10.

Figure 6:
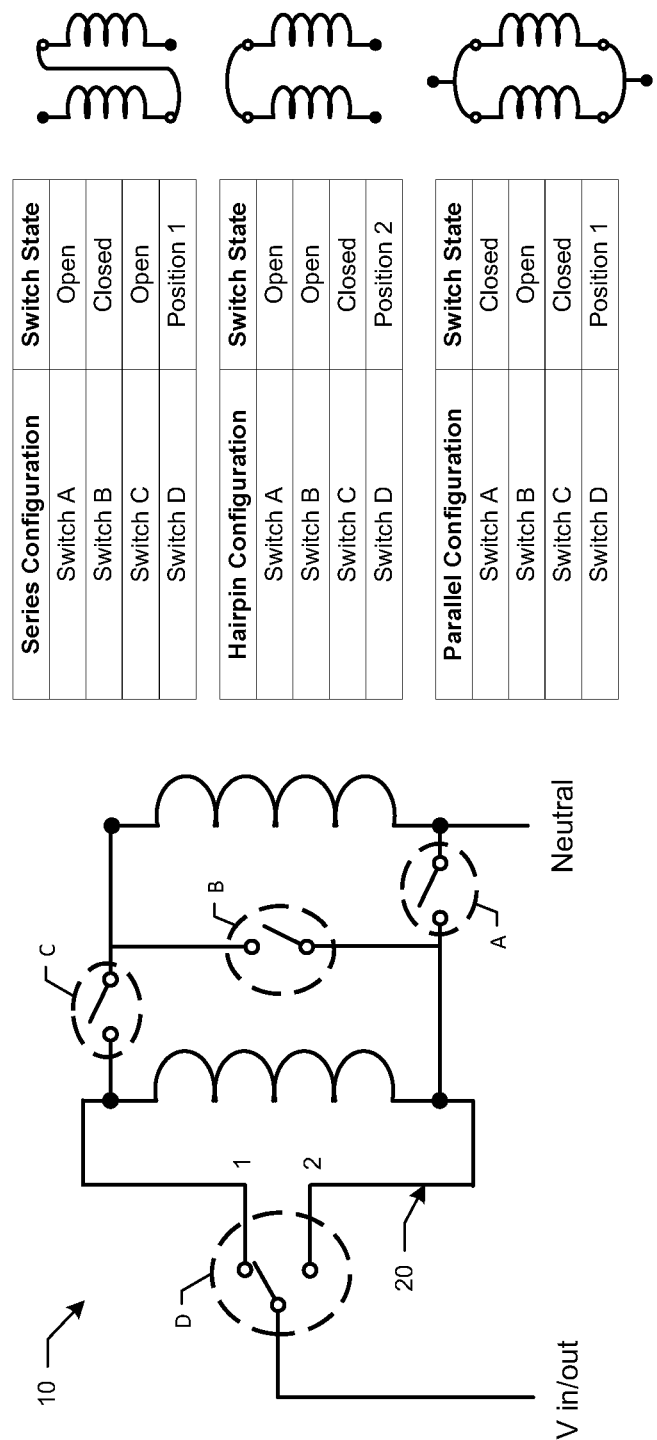
FIG. 6 is a schematic of a switching network that enables three states to be employed by a system, and a table identifying the positions and states of various switches within the switching network to achieve the three states.

Referring to FIG. 6, the electrical system 10 may include a control system, such as a switching network 20. The switching network 20 enables multiple states, for example up to three states, to be employed by the electrical system 10. The switching network 20 may include a plurality of switches, for example Switch A, Switch, B, Switch C, Switch D, or any combination thereof. By actuating the various switches in predetermined states (open or closed), and/or positions (position 1 or position 2, for example), the switching network 20 may selectively connect the first coil 16 and the second coil 18 in one of the multiple states (for example, series, hairpin, or parallel).

Figure 7:
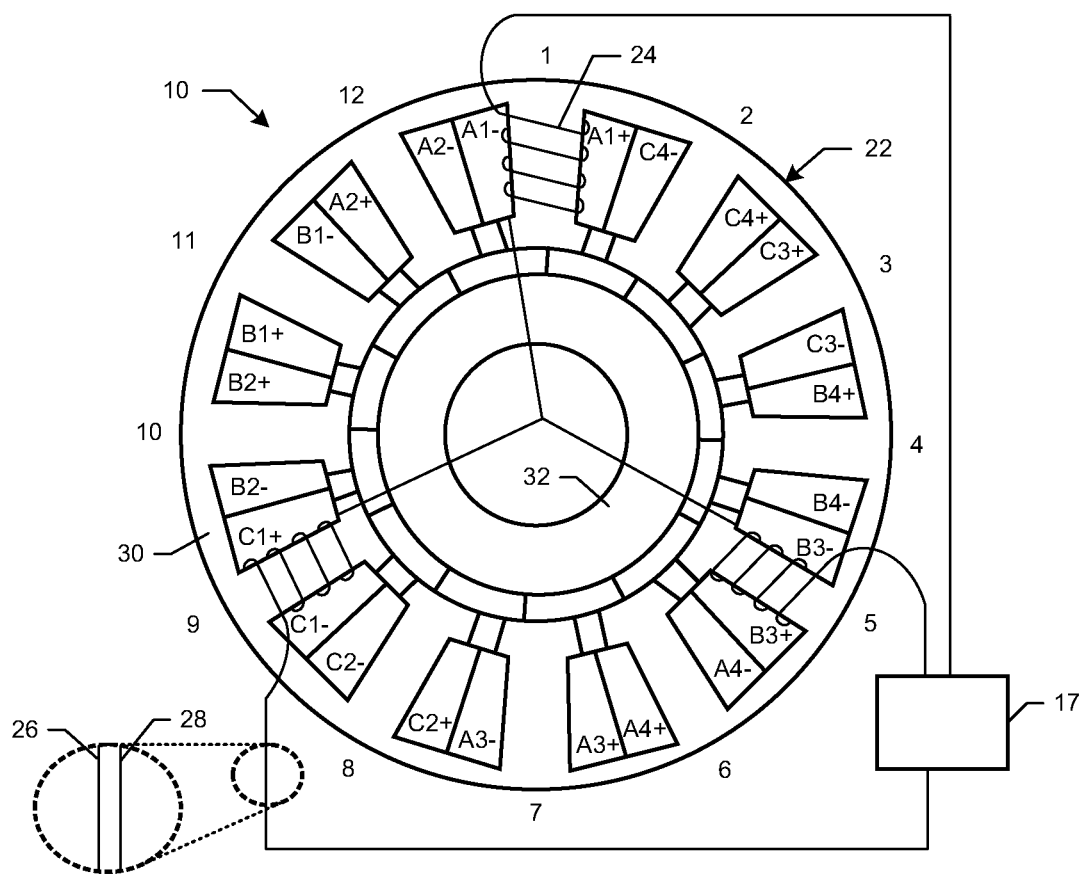
FIG. 7 is a side, elevation view of a three-phase internal rotor permanent magnet rotating electric machine having twelve concentrated stator windings, according to one implementation.

Referring to FIG. 7, the electrical system 10 may include an electric machine 22, for example a three-phase internal rotor permanent magnet rotating electric machine having a number of stator windings 24, for example concentrated stator windings. Each of the concentrated stator windings 24 includes at least two conductive wires, for example a first conductive wire 26 and a second conductive wire 28 wound about a portion of the electric machine 22, for example a portion of a stator 30 of the electric machine 22 as shown, or alternatively a portion of a rotor 32 of the electric machine 22. The stator windings 24 may include more than two conductive wires, for example four conductive wires. Connecting the, for example, four conductive wires may further modify the speed torque characteristic for the electric machine 22. This would in effect provide another electrical gear beyond the described series and parallel configurations.

As shown in the illustrated embodiment, the electric machine 22 may include twelve concentrated stator windings. The twelve concentrated stator windings may include four sets of three phase coils. As shown in the illustrated embodiment, one of the four sets of three phase coils of the twelve coil electric machine 22 is shown wound together. The other three sets of three phase coils may be similarly wound, but is not shown for the benefit of clarity of the drawing. In the case where a short has produced an unsustainable operating condition, the electrical system 10 isolates the specific phase coil set experiencing the short, for example through employing an inductive cancellation technique to that phase coil set.

The electric machine 22 may include a switching module 17, which selectively isolates the phase coil set when a short occurs in that phase coil set. The switching module 17 may include elements of the switching network 20 as described above to enable selection of one of multiple states for the set of phase coils. The isolation and disablement of one of the four sets of three phase coils allows the remaining three sets of coils (nine coils in total) to continue to operate as a balanced machine. This design would allow 75% of the machine capacity to continue to operate given a shorting condition.

Figure 8:
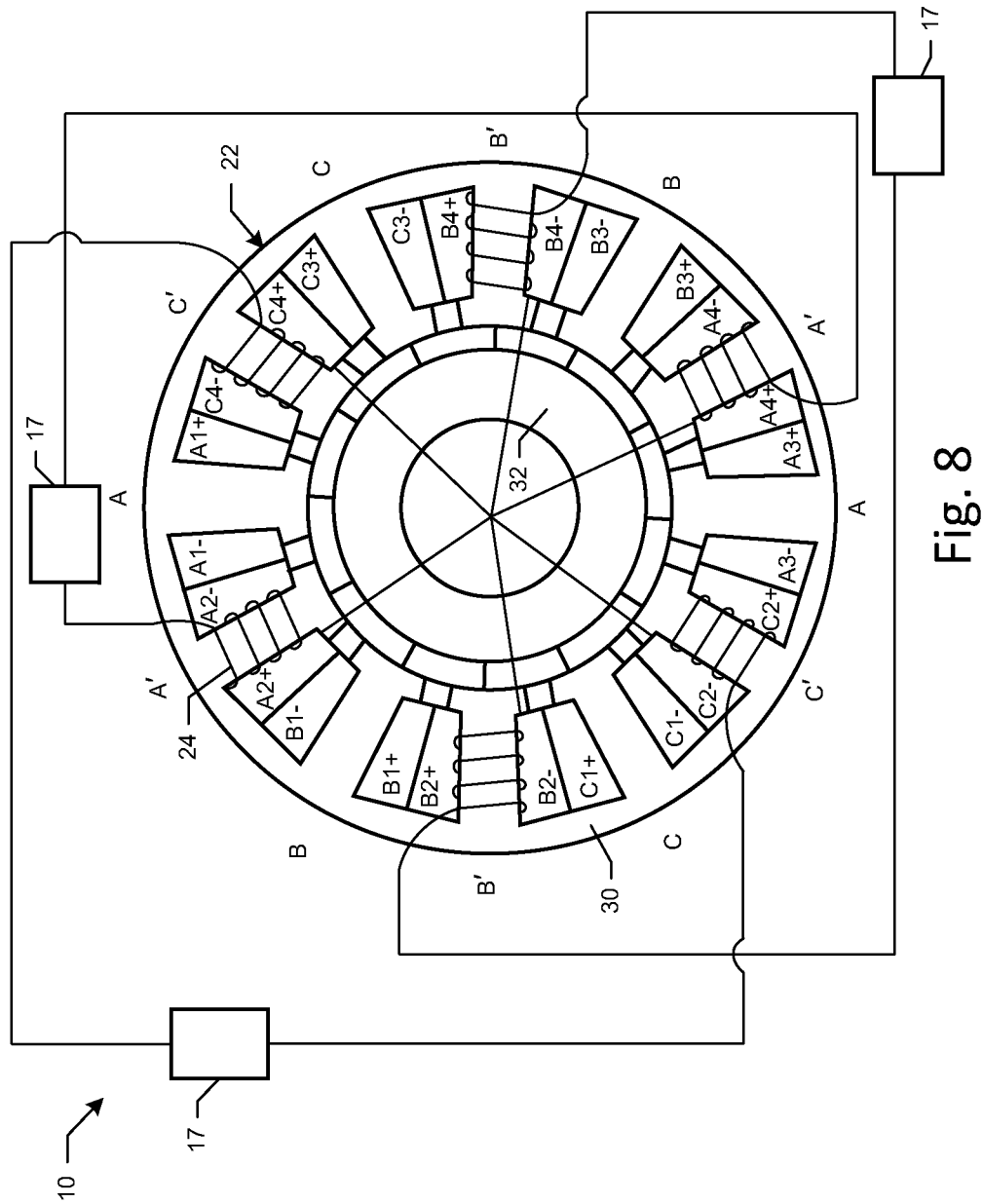
FIG. 8 is a side, elevation view of a three-phase internal rotor permanent magnet rotating electric machine having twelve concentrated stator windings, according to another implementation.

Referring to FIG. 8, the electric machine 22, may be wound such that the electric machine 22 is effectively divided into two balanced halves, each half including two respective coils from phase A, two respective coils from phase B, and two respective coils from Phase C. As shown, respective coils from phase A, phase B, phase C, or any combination thereof may be connected via respective ones of the switching module 17. Alternatively, the respective coils from phase A, phase B, phase C, or any combination thereof may all be connected to the same switching module 17, rather than each to a respective one of the switching module 17.

The isolation and disablement of one of the two sets of three phase coils allows the remaining set of coils (six coils in total) to continue to operate as a balanced machine. This design would allow 50% of the machine capacity to continue to operate given a shorting condition. It will be appreciated that the electrical system 10 may include electric machines 22 with other numbers of concentrated stator windings, and other numbers of sets of three phase coils, such that a desired percentage of the machine capacity would remain operational in the event of a short, and subsequent isolation of one of the sets of coils.

Figure 9:
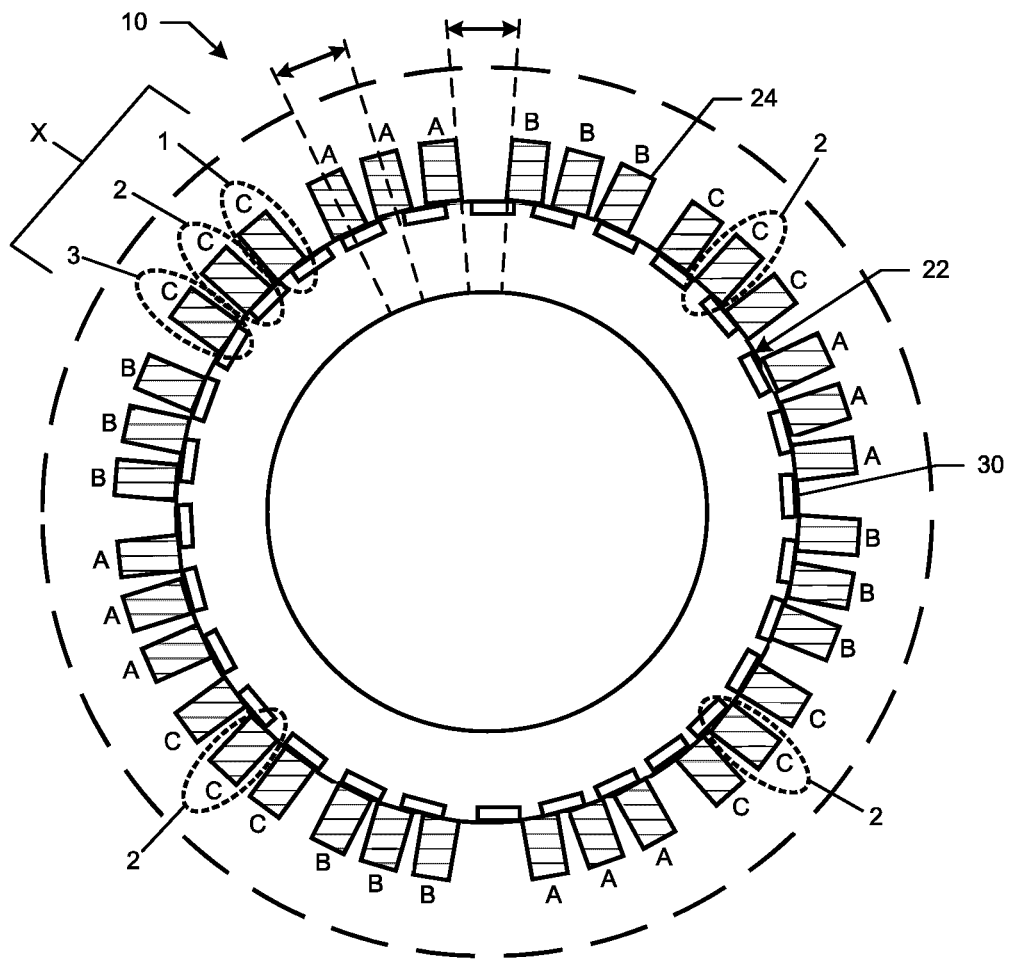
FIG. 9 is a is a side, elevation view of a three-phase permanent magnet rotating electric machine having thirty-six concentrated stator windings, according to one implementation.

Referring to FIG. 9, the electric machine 22 may include a large number of concentrated stator windings 24 (for example thirty-six as shown). The electric machines 22 including a large number of coils, such as thirty-six or more, windings may be grouped into larger subsets to reduce the complexity and cost of the fault tolerant technology. For example, rather than twelve separate three phase coil sets all having the required switching means to effect the fault tolerance technique, the system could be divided in larger subsets having two, three, four or more sets of phase coil windings grouped together.

There are many different architectures for which windings may be situated around the stator 30. As shown in the illustrated embodiment, the thirty-six coil stator physically may be grouped into blocks of three adjacent coils located around the stator 30. Each grouping of three phase coils includes another set of three coils in the same phase located at 180-degrees around the stator. As shown, there may be four phase bocks for each of the three phases and numerous ways to divide the coils of the electric machine 22 to affect an optimized implementation of the technology, which maintains both mechanical and electrical balance.

Where the thirty-six coil machine is divided into three subset machines, the windings 24 are divided into three groups of three phase windings all of which have the fault isolation circuit implemented. Should a short occur, the electrical machine's 22 remaining elements would provide a functional machine that is two thirds of the machines original rated capacity. This could be accomplished by simply grouping one coil from each grouping block in a symmetrical location around the stator. From grouping block X, the identified coil numbers 1, 2, and 3 would all be wired to the respective windings 1, 2, and 3 of all other coil groupings, while maintaining the phase relationships and the neutral point given a Wye winding configuration.

Should a more capable (higher power density) machine be desired in a post short situation, the electrical machine 22 may be divided into more isolated winding groups, all of which provide the fault isolation capability. The practical limits for implementing the tech would be across the range of 50% the machine maintaining operations in a faulted condition (requires only 2 inductive cancelation circuits) all the way to the other extreme which would allow all but one (for example 35 of the 36, as shown) of the coils to continue to operate where there is a short in one of the isolated coils.

Referring to FIGS. 7 to 9, a Wye three phase winding configuration is illustrated. It will be appreciated that the electric machine 22 may include a Delta winding scheme, and/or machines other than three phase. Similarly, although a concentrated winding scheme is illustrated, the electric machine 22 may include a distributed winding scheme. Additionally, the electric machine 22 may include a non-PM design, for example one that includes a large number of coils supported by either the stator 30 or the rotor 32.

According to an implementation, the electrical system 10 may include an inverter that also includes fault tolerant capabilities. Such an electrical system 10 would provide fault mitigation at a system level to further ensure continued operation of the electric machine 22 even after a fault occurs.

The inverter may be a four-level inverter with one redundant leg. In the event of a failure in one of the three active inverter legs/phases, the electrical system 10 swaps out the compromised phase with the redundant fourth inverter leg, thus enabling continued operation of the electric machine 22.

This application claims priority to U.S. patent application 62/837,554, filed Apr. 23, 2019, the disclosure of which is hereby incorporated by reference, in its entirety.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical system comprising:
a rotating electric machine, the rotating electric machine comprising:
a rotor that is rotatable about a rotor axis;
a stator positioned so as to enclose a portion of the rotor such that the rotor is rotatable about the rotor axis relative to the stator;
a plurality of coils supported by either the rotor or the stator such that rotation of the rotor relative to the stator generates a flux through each of the plurality of coils; and
a subset of the plurality of coils including at least two of the plurality of coils that are coupled together such that upon occurrence of a fault in one of the subset of the plurality of coils, all of the coils within the subset are isolatable from the remainder of the plurality of the coils,
wherein flux generated by each coil of the isolated subset of the plurality of coils caused by rotation of the rotor relative to the stator is reduced compared to flux generated by each coil of the subset prior to being isolated; and
a control system that includes a plurality of switches, the switches operable to transition one or more of the coils of the plurality of coils into at least three types of connections at respective times, a first type of the at least three types of connections being a series connection of two or more of the coils, a second type of connection of the at least three types of connections being a hairpin connection of two or more of the coils, and a third type of connection of the at least three types of connections being a parallel connection of two or more of the coils.

2. The electrical system of claim 1 wherein at least one of the plurality of coils includes a first conductive wire and a second conductive wire wound around a portion of the stator or the rotor.

3. The electrical system of claim 1, wherein the control system includes at least one sensor that detects the occurrence of a fault within at least one of the plurality of coils.

4. The electrical system of claim 1 wherein each of the subset of the plurality of coils are physically, equally spaced about the rotor axis.

5. The electrical system of claim 1, further comprising:
an inverter including at least one redundant leg, which swaps with an active, compromised leg of the inverter.

6. The electrical system of claim 1, wherein:
the plurality of windings include a first conductive wire and a second conductive wire each wound around a portion of the stator.

7. The electrical system of claim 2, wherein the control system is operable to selectively couple the first conductive wire to the second conductive wire such that the control system transitions connection of the first conductive wire and the second conductive wire from the first type of connection to the second type of connection.

8. The electrical system of claim 3, wherein upon receipt of feedback from the at least one sensor that a fault has occurred within at least one of the plurality of coils the control system isolates the subset of the plurality of coils.

9. The electrical system of claim 4 wherein the subset of the plurality of coils includes three coils, and each of the three coils are physically spaced 120 degrees apart about the rotor axis from adjacent ones of the three coils.

10. The electrical system of claim 6 wherein the first conductive wire and the second conductive wire are equal in length.

11. The electrical system of claim 6 wherein the first conductive wire and the second conductive wire are both wound around the portion of the stator in a side-by-side arrangement to form one of the plurality of coils.

12. The electrical system of claim 6 wherein the first conductive wire and the second conductive wire are both wound around the portion of the stator in an end-to-end arrangement to form one of the plurality of coils.

13. The electrical system of claim 7 wherein the control system selectively couples the first conductive wire to the second conductive wire such that the control system transitions connection of the first conductive wire to the second conductive wire from one of the first type of connection or the second type of connection to the third type of connection.

14. A method of operating a rotating electric machine, the method comprising:
rotating a rotor of the electric machine relative to a stator of the electric machine, thereby rotating at least one permanent magnet attached to one of the rotor and the stator relative to a plurality of coils that are attached to the other of the rotor and the stator, wherein the rotating electric machine outputs a first capacity;
operating a plurality of switches to selectively transition one or more of the coils of the plurality of coils into at least three types of connections at respective times, a first type of the at least three types of connections being a series connection of two or more of the coils, a second type of connection of the at least three types of connections being a hairpin connection of two or more of the coils, and a third type of connection of the at least three types of connections being a parallel connection of two or more of the coils;
detecting a fault in at least one of the plurality of coils;
isolating a number of the plurality of coils, the number of the plurality of coils including the at least one of the plurality of coils, thereby reducing flux generated by the number of the plurality of coils by rotation of the at least one permanent magnet relative to the plurality of coils; and
subsequent to isolating the at least one of the plurality of coils, continuing to rotate the rotor relative to the stator such that the rotating electric machine outputs a second capacity that is lower than the first capacity.

15. The method of claim 14 wherein isolating the number of the plurality of coils includes isolating at least one of the plurality of coils in addition to the at least one of the plurality of coils in which the fault is detected.

16. The method of claim 14, further comprising:
connecting the first conductive wire and the second conductive wire to a plurality of switches;
actuating one or more of the plurality of switches to transition from the first type of connection between a first conductive wire and a second conductive wire to the second type of connection between the first conductive wire and the second conductive wire; and
actuating one or more of the plurality of switches to transition from the second type of connection between the first conductive wire and the second conductive wire to a third type of connection between the first conductive wire and the second conductive wire.

17. The method of claim 14 wherein detecting the fault includes a sensor of the rotating electric machine identifying the fault, and the method further comprises:
isolating the number of the plurality of coils automatically based on feedback from the sensor.

18. The method of claim 15 wherein the number of the plurality of coils includes a set of three of the plurality of coils and isolating the number of the plurality of coils includes isolating the three coils including the at least one of the plurality of coils in which the fault is detected.

19. The method of claim 18 wherein each of coils in the set of three of the plurality of coils is offset from the other coils in the set of three of the plurality of coils by 120 degrees as measured about an axis of rotation of the rotor and isolating the number of the plurality of coils includes isolating the three of the plurality of coils which are offset from one another by 120 degrees including the at least one of the plurality of coils in which the fault is detected.

20. The method of claim 18 wherein the rotating electric machine is a three-phase electric machine, a first coil in the set of three of the plurality of coils is part of a first phase of the rotating electric machine, a second coil in the set of three of the plurality of coils is part of a second phase of the rotating electric machine, and a third coil in the set of three of the plurality of coils is part of a third phase of the rotating electric machine and isolating the number of the plurality of coils includes isolating a respective one of the plurality of coils from each of the first phase, the second phase and the third phase.

* * * * *